United States Patent Office 3,338,931
Patented Aug. 29, 1967

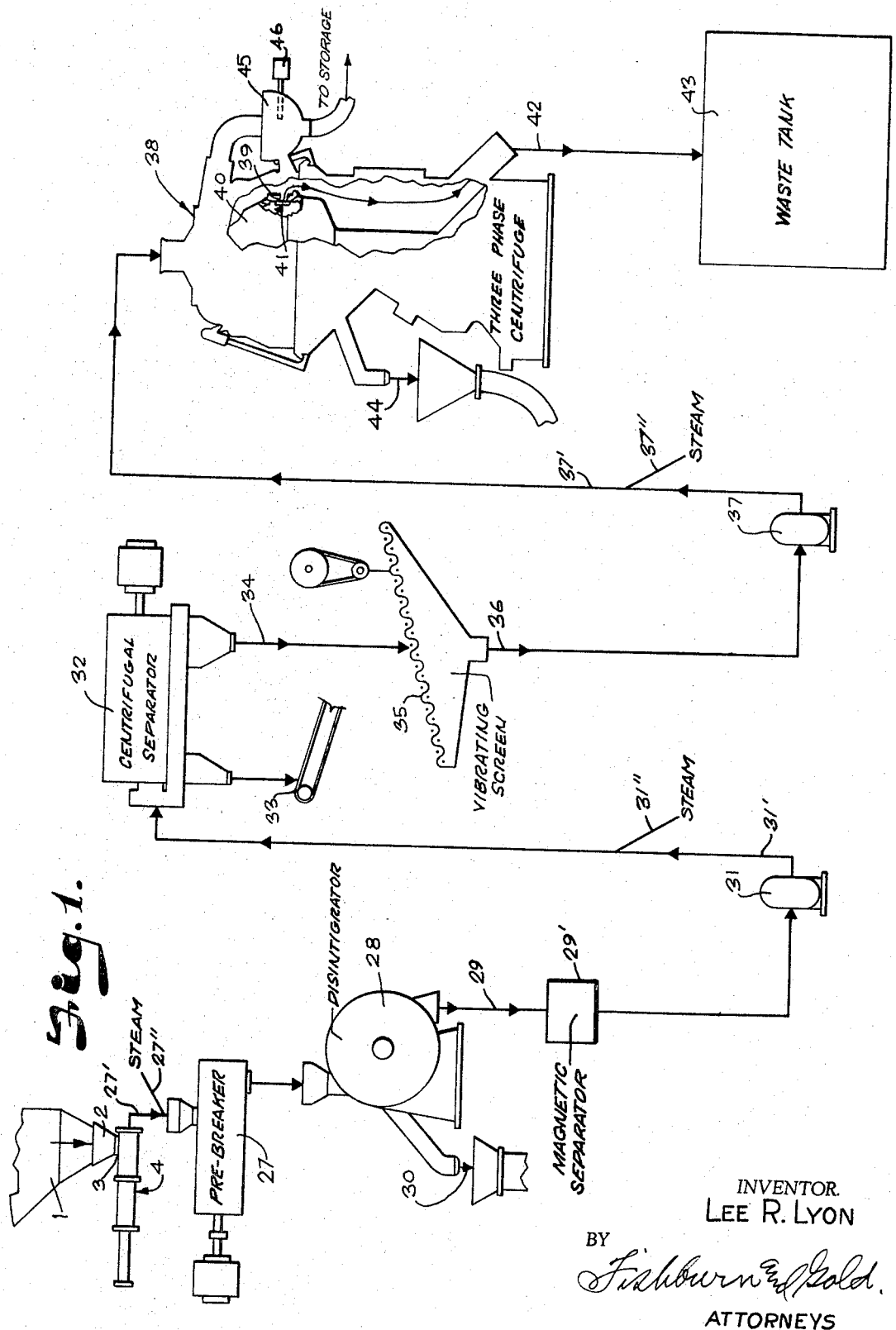

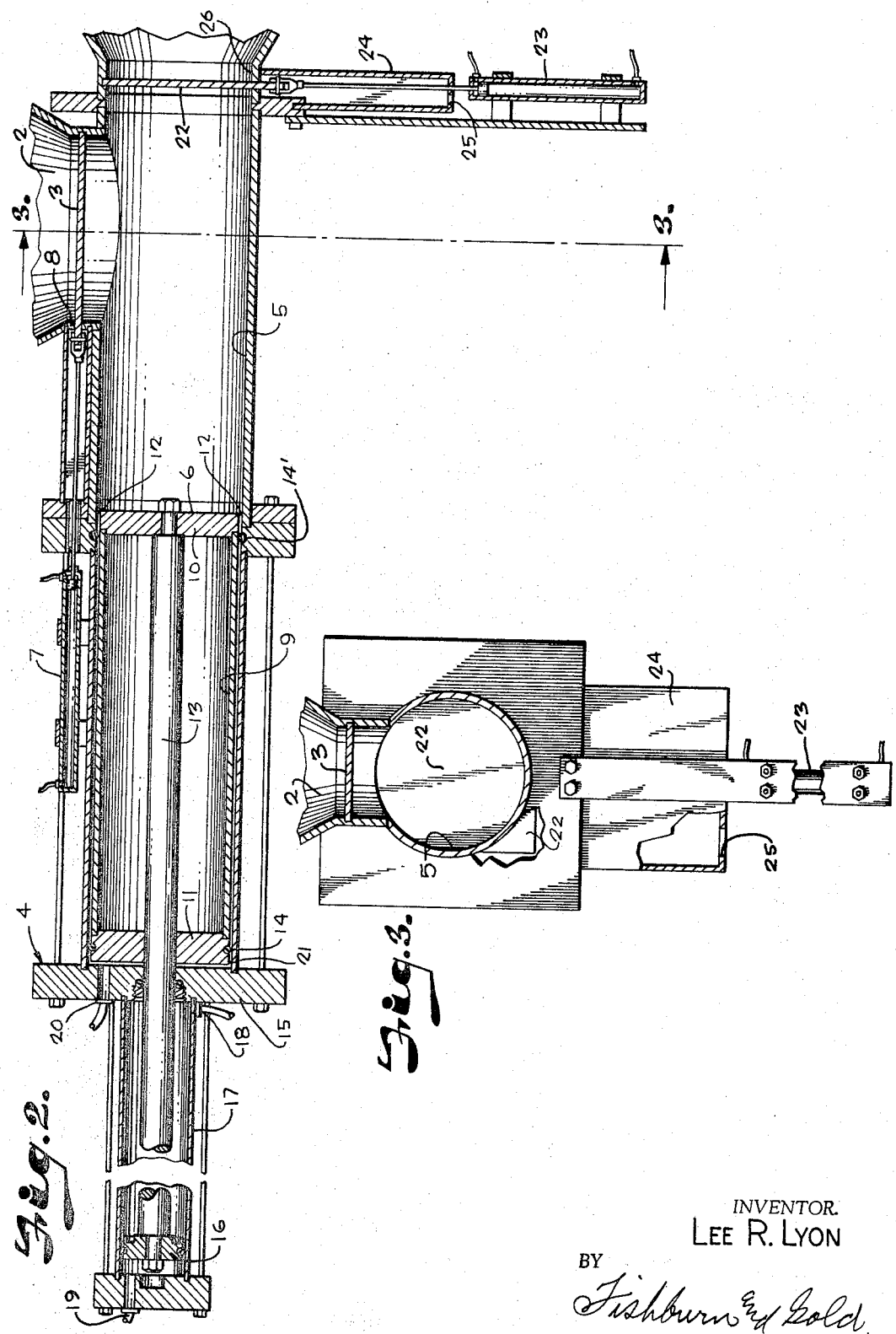

3,338,931
PROCESS FOR OBTAINING OIL FROM
ANIMAL HIDES
Lee R. Lyon, Kansas City, Mo., assignor to Lycoil, Inc.,
Kansas City, Mo., a corporation of Missouri
Filed Oct. 9, 1963, Ser. No. 314,913
4 Claims. (Cl. 260—412.6)

This invention relates to the manufacture of organic oils, and more particularly to a process and apparatus for recoving low titer oil or grease from the fleshings of cured or uncured animal hides.

Scrapings from the inner or flesh side of hides used for making leather have been known to contain a relatively small proportion of valuable low titer oils or greases not found generally throughout the interior of the animal. Heretofore, such scrapings known to the trade as "fleshings," have been subjected to various processes for recovering the oil therefrom; however, such processes either used high temperature rendering methods which have a detrimental effect on the recovered oil or were commonly uneconomical due to slow recovery rates and failure to extract a large percentage of the available oil. Further, serious problems often resulted from the tendency of the fleshings to clog and hinder recovery machinery due to the presence therein of glue, stringy sludge-like material, hairs and fibrous solids forming a large proportion of the fleshings.

The principal objects of the present invention are: to provide a process for obtaining low titer oil or grease from hide fleshings without high temperature rendering; to provide such a process which removes a greater proportion of the oils from the fleshings at substantially lower temperatures and heating of less duration than heretofore; to provide such a process which permits substantially continuous and high speed recovery of the oil without constant human supervision; to provide such a process which is subject to finer control than existing processes; and to provide such a process and apparatus which permits greater economy in the recovery of low titer oils from hide fleshings.

Other objects and advantages of this invention will become apparent from the following description taken in connection with the accompanying drawings wherein are set forth by way of illustration and example certain embodiments of this invention.

FIG. 1 is a schematic flow diagram showing the various treating steps to which the fleshings are subjected in recovering the oil.

FIG. 2 is a fragmentary cross-sectional side elevational view of a novel pump used for reliably transporting raw uncomminuted fleshings into processing apparatus.

FIG. 3 is a fragmentary cross-sectional view through the pump taken on the line 3—3, FIG. 2.

Referring to the drawings in more detail:

The reference numeral 1 indicates a storage tank into which the fleshings from cured or uncured hides are placed. During scraping and preparation of the hides, there is some washing action which introduces water into the fleshings which mixes with fat and miscellaneous fibrous and hairy material also present. With salted or cured hides the water in the fleshings is salt water, with uncured hides the water is fresh water. The fleshings collect in a tank or basin 1. The tank 1 communicates by means of a funnel or duct 2 containing the sliding input valve 3 of a fleshings pump 4.

The pump 4 is of special design to prohibit the fouling thereof with the viscous, stringy fleshings while providing a uniform output rate. The pump 4 includes a hollow pump cylinder 5 into which the fleshings partly fall and are partly sucked through operation of a reciprocating piston 6. The cylinder 5 is opened for charging when the input valve 3 is slidably withdrawn from a blocking position across the duct 2 by means of a fluid-operated cylinder 7. The withdrawal of the valve 3 during the charging cycle renders the duct 2 virtually unobstructed so that the various solid, semi-solid, stringy and viscous portions of the fleshings may freely enter the pump cylinder 5. The valve 3 is closed by reversing the operation of the cylinder 7 which causes the valve 3 to slide transversely through the fleshings mass remaining in the duct 2, which is the plane of least resistance. Should stringy material in the fleshings be caught on the valve 3, it is not serious since if complete closure is not obtained the pump will still operate satisfactorily and the valve 3 will likely be cleared on the subsequent reciprocation by withdrawal in scraping relation to the walls 8 of the duct 2.

The piston 6 comprises an elongated cylindrical shell 9 having end caps 10 and 11 secured thereto forming a closed elongated cylindrical structure within the pump cylinder 5. Substantial clearance is provided at 12 between the end cap 10 and shell 9 and the interior of the pump cylinder 5, this clearance being maintained by the coaxial positioning of a support shaft 13 within the pump cylinder 5 which shaft is fixed with respect to and supports the end caps 10 and 11. The end cap 11 has a suitable flexible O-ring seal 14 which slidably engages the interior surface of the pump cylinder 5 maintaining a seal therewith. An O-ring seal 14' is provided in the cylinder 5 to slidably engage the piston shell 9 to maintain a seal therewith. The O-ring 14' is preferably located in the cylinder to engage the shell 9 adjacent the end cap 10 when the piston is retracted as in FIG. 2. 13 extends rearwardly and slidably through the rear wall 15 of the pump 4 and terminates fixed to a piston 16 of a fluid-operated cylinder 17 which, through the selective introduction of suitable fluids into passageways 18 and 19, causes the piston 16 to reciprocate resulting in the axial reciprocation of the piston 6. A fluid passageway 20 is provided for introducing the fluid into the space 21 between the end cap 11 and rear wall 15 in order to greatly add to the available force for moving the piston 6 on the pumping stroke thereof where the greater force is required. The unique shape of the piston 6 and the cooperation thereof with the pump cylinder 5 has been found to permit the high pressure pumping and displacement of the raw uncomminuted fleshings in the pump cylinder 5 without fouling the pump cylinder.

Upon closure of the input valve 3, after filling of the pump cylinder 5, an output valve 22 opens. The valve 22 normally blocks the end of the pump cylinder 5 opposite to the piston 6 and is slidably withdrawn for opening by means of a fluid-operated cylinder 23, unblocking the entire end of the pumping cylinder 5 for ease of contents removal. The output valve 22 is withdrawn into a box-like structure 24 during the opening cycle thereof and a suitable drainage opening 25 is provided in the structure 24 to prevent the build-up of drippings not removed by scraping against the wall 26 of the pump cylinder. The output valve 22 in closing cuts transversely across the end of the pump cylinder 5 for minimum resistance to movement thereof. It is to be understood that any suitable valve sequencing device may be used for timing the various fluid flows into the fluid cylinders associated with the pump 4 to provide automatic operation at a desired pumping speed.

The pump 4 pumps the raw uncomminuted fleshings through a flow line 27' to a pre-breaker 27. The flow or stream of raw uncomminuted fleshings is subjected to heat to increase the temperature thereof to about 200° F. just before it enters the pre-breaker 27. The heating is provided by sparging steam into the flow line 27 by means of a temperature responsive steam sparging connection 27". The pre-breaker 27 is for reducing large particles to chunks about golf ball size which can be handled by subsequent apparatus used in the process. From the pre-breaker, the fleshings are introduced into a disintegrator 28 adapted to remove the substantially ungrindable solid particles by screen separation and comminute the remainder to not greater than about ¾ inch. The comminuted fleshings are then discharged through a flow line 29 which preferably has a magnetic separator 29' therein for removal of metal particles from said fleshings passing therethrough. The ungrindable particles are discharged at 30 and discarded.

The fleshings in the flow line 29 have cooled in passage through the pre-breaker 27 and disintegrator 28 are preferably reheated. The flow line 29 is connected to a pump 31 and the fleshings are continuously pumped by means of the pump 31 in a stream through a flow line 31' to a centrifugal separator 32. The reheating of the fleshings in the illustrated system is by sparging steam into the flow line 31' between the pump 31 and the separator 32 to heat the fleshings to approximately 180° F. to 200° F. prior to delivering to the separator. The steam is supplied to the flow line 31' by a temperature responsive steam sparging connection 31". The centrifugal separator 32 is adapted to separate flowable liquids from heavier solids or semi-solids of the type which may pass through the disintegrator 28. Such solids in the fleshings primarily include damp fibrous material and the oil normally associated therewith is largely displaced in the separator 32 by the greater density water in the fleshings whereupon the oil is forced into and remains with the flowable liquid portion of the fleshings while a large proportion of the damp, heavier solids or semi-solids are discharged to a conveyor 33 for delivery to a suitable drier (not shown) for drying said solids to a salable condition. The largely flowable remainder of the fleshings is continuously released from the centrifugal separator at 34 whereupon it is directed through a vibrating screen 35 of approximately 20-mesh to remove remaining solid or semi-solid particles of a size which may clog or damage equipment used later in the process.

The flowable liquids and fine solids and semi-solids remaining are directed from the vibrating screen 35 through a flow line 36 to a pump 37. The fleshings are then pumped by the pump 37 through a flow line 37' into a three-phase centrifuge 38. The fleshing material in the flow from the screen to the three phase centrifuge is preferably reheated to raise the temperature to approximately 180° F. to 200° F. In the system illustrated the reheating is by sparging steam into the stream in the flow line between the pump 37 by a temperature responsive steam sparging connection 37". The three phase centrifuge 38 is of the type wherein the outer face 39 of the bowl 40 therein periodically opens by withdrawing a gate 41 to discharge all bowl contents. This is in contrast to the more common multiple phase centrifuge which uses nozzles to continuously discharge particular phases of the bowl contents. The centrifuge 38 is required because, even after the various steps of the process above described, fine heavy solids and interfacial solids still make up a significant part of the fleshings remainder. The heavy solids may tend to clog up a nozzle type centrifuge. More troublesome, however, are the interfacial solids which tend to collect between the oil and water phase in the bowl and eventually stop oil production. To prevent this, the entire bowl contents are periodically discharged at 42 into a waste receiver 43. The water in the fleshings is separated at 44 and the valuable low titer oil is collected at 45. A purity control probe 46 is connected to the oil collection point 45 and is arranged whereby if the oil being recovered is rancid or not of the desired quality, the probe causes the centrifuge to dump its contents. This aids in assuring high quality oil recovery.

Heretofore, the efficient removal of the interfacial particles constituted a serious problem. One method has been to use a surfactant which caused the facial particles to settle out; another method requires the addition of large quantities of water which increases the amount of heat required. However, these methods are significantly more expensive and less efficient than the above-described process.

Reasonably low temperatures are used throughout the instant process to prevent a deterioration of the final product and the fleshings are moved through the various steps substantially continuously avoiding the likelihood of overtreating certain portions of the fleshings which is inherent in known batch processes. Also the shortness of the time duration in which the fleshings are subjected to heat is an advantage. Heat is applied in the flow in portions of the travel of the fleshings in the process and for travel from the tank 1 to the oil collection point 45 only requires 10 to 15 minutes. This eliminates the reduction in quality that occurs in prior processes where the fleshings were heated for long periods as for example 2 to 3 hours. Further, due to the unique pump for handling the raw uncomminuted fleshings and the substantially continuously operating machines performing the steps of the process, few personnel are required and yet high speed efficient operation is not sacrificed.

It is to be understood that while one form of this invention has been illustrated and described, it is not to be limited to the specific form herein described and shown except insofar as such limitations are included in the claims.

What I claim and desire to secure by Letters Patent is:

1. The process of treating animal hides to obtain low titer oil therefrom consisting of the steps: scraping the flesh side of said hides whereupon raw fleshings are obtained comprising a mixture of flesh, fat, water and miscellaneous fibrous and hairy materials, subjecting said fleshings to heat to raise the temperature thereof to approximately 180° F. to 200° F., removing particles which are substantially ungrindable from said fleshings and reducing the particle size of the remaining solid fleshings, moving said reduced fleshings in a stream, subjecting said reduced fleshings to heat by sparging steam into said stream of reduced fleshings to raise the temperature thereof to approximately 180° F. to 200° F., and then centrifugally separating said reduced fleshings into flowable liquids and heavy solids, flowing the flowable liquids in a stream, reheating said flowable liquids by sparging steam into said stream thereof to raise the temperature thereof to approximately 180° F. to 200° F., and then centrifugally separating said heated flowable liquids into oil, water and sludge, and collecting said oil.

2. The process of treating animal hides to obtain low titer oil therefrom consisting of the steps: scraping the flesh side of said hides whereupon raw fleshings are obtained comprising a mixture of flesh, fat, water and miscellaneous fibrous and hairy materials, moving said fleshings in a stream, subjecting said fleshings to heat by sparging steam into said stream, removing particles which are substantially ungrindable from said fleshings and reducing the particle size of the remaining solid fleshings to a particle size not greater than ¾ inch, moving said reduced fleshings in a stream, subjecting said reduced fleshings to a heating by sparging steam into said stream of reduced fleshings to raise the temperature thereof to approximately 180° F. to 200° F., then centrifugally separating said reduced fleshings into flowable liquids and heavy solids, said screening flowable liquids to substantially remove remaining solid and semi-solid particles, flowing the remaining flowable liquids in a stream, reheating said remaining liquids by sparging steam into said stream thereof to raise the temperature thereof to approximately 180° F. to 200° F., and then centrifugally separating said heated flowable liquids into oil, water and sludge, and collecting said oil.

3. The process of treating animal hides to obtain low titer oil therefrom consisting of the steps: scraping the flesh side of said hides whereupon raw fleshings are obtained comprising a mixture of flesh, fat, water and miscellaneous fibrous and heairy materials, moving said fleshings in a stream, subjecting said fleshings to heat by sparging steam into said stream to raise the temperature of said fleshings to approximately 180° F. to 200° F., then removing particles which are substantially ungrindable from said fleshings and reducing the particle size of the remaining solid fleshings to a particle size not greater than ¾ inch, moving said reduced fleshings in a stream, subjecting said reduced fleshings to a reheating by sparging steam into said stream of reduced fleshings to raise the temperature thereof to approximately 180° F. to 200° F., then centrifugally separating said reduced fleshings into flowable liquids and heavy solids, the heavy solids primarily including damp fibrous material, and oil normally associated with said latter material being largely displaced by water during said separation and forming part of the flowable liquids, drying said heavy solids, screening said flowable liquids to substantially remove remaining solid and semi-solid particles, flowing the remaining flowable liquids in a stream, reheating said flowable liquids by sparging steam into said stream thereof to raise the temperature thereof to approximately 180° F. to 200° F., then centrifugally separating said heated flowable liquids into oil, water and sludge, and collecting said oil.

4. The process as set forth in claim 3 wherein said sludge is periodically discharged during said three-phase centrifugation by discharging the entire contents of the centrifuge bowl.

References Cited

UNITED STATES PATENTS 3,222,384   12/1965   Blumberg et al. ____ 260—412.6

HENRY R. JILES, *Primary Examiner.*

CHARLES B. PARKER, *Examiner.*

A. H. SUTTO, R. BOYD, *Assistant Examiners.*